(12) United States Patent
Meholic

(10) Patent No.: US 6,505,462 B2
(45) Date of Patent: Jan. 14, 2003

(54) ROTARY VALVE FOR PULSE DETONATION ENGINES

(75) Inventor: Gregory Vincent Meholic, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 79 days.

(21) Appl. No.: 09/821,274

(22) Filed: Mar. 29, 2001

(65) Prior Publication Data

US 2002/0139106 A1 Oct. 3, 2002

(51) Int. Cl.[7] .................................................. F02C 5/12
(52) U.S. Cl. ........................ 60/39.39; 60/39.38; 60/726
(58) Field of Search ............................ 60/39.39, 39.38, 60/726, 532

(56) References Cited

U.S. PATENT DOCUMENTS 5,345,758 A * 9/1994 Bussing
5,557,926 A * 9/1996 Hunter, Jr. et al. ............ 60/247
5,901,550 A * 5/1999 Bussing et al. ............. 60/39.38

OTHER PUBLICATIONS

T.R.A. Bussing, A Rotary Valve Multiple Pulse Detonation Engine (RVMPDE), 31st AIAA/ASME/SAE/ASEE Joint Propulsion Coference and Exhibit, San Diego, CA, Jul. 10–12, 1995, AIAA 95–2577.

P.P Lo et al., Development of a Fuel Injection System for a High Frequency Pulse Detonation Engine, 33rd AIAA/ASME/SAE/ASEE Joint Propulsion Conference and Exhibit, Seattle, WA, Jul. 6–9, 1997, AIAA–97–2744.

J.B. Hinkey et al., Rotary–Valved, Multiple–Cycle, Pulse Detonation Engine Experimental Demonstration, 33rd AIAA/ASME/SAE/ASEE Joint Propulsion Conference and Exhibit, Seattle, WA, Jul. 6–9, 1997, AIAA 97–2746.

* cited by examiner

Primary Examiner—Charles G. Freay
Assistant Examiner—John F Belena
(74) Attorney, Agent, or Firm—Rodney M. Young; Pierce Atwood

(57) ABSTRACT

A rotary valve for pulse detonation engines includes a rotor rotatively mounted in the forward end of the pulse detonation tube and a plurality of transfer plenums for receiving fuel and air arranged around the rotor and partially disposed over the forward end of the tube. The rotor has a plurality of internal flow passages formed therein which periodically align with a plurality of inlet ports formed near the forward end of the tube as the rotor rotates. Each one of the transfer plenums is aligned with a corresponding one of the inlet ports so that the flow passages will establish fluid communication between the tube and the transfer plenums when aligned with the inlet ports. Additional features include axial injection of the fuel-air mixture into the pulse detonation tube, pre-compression of the inlet flow and a drive system located outside of the primary gas path.

24 Claims, 3 Drawing Sheets

ROTARY VALVE FOR PULSE DETONATION ENGINES

BACKGROUND OF THE INVENTION

This invention relates generally to pulse detonation engines and more particularly to rotary valves for controlling the flow of fuel and air in pulse detonation engines.

Most internal combustion engines currently used for propulsion rely on deflagration combustion whereby the combustion effects occur at relatively slow rates (i.e., less than the speed of sound within the combustible mixture) and at constant pressure. Detonation combustion, however, occurs at rates well in excess of the speed of sound and simultaneously provides a significant pressure rise. Because of the advantageous thermodynamic cycle, there is a high degree of interest in developing propulsive devices that rely on detonation combustion rather than deflagration combustion.

One such device is a pulse detonation engine that uses an intermittent combustion process to create a temperature and pressure rise by detonating a flammable mixture. The conditions for detonation are governed by the environment of the mixture (pressure, temperature, equivalence ratio, etc.) such that when enough energy is released to start ignition, the chemical kinetics occur at supersonic speeds. A pulse detonation engine is typically a tube of a specified length that is open at the aft end and includes some sort of valve device at the front end to keep the detonation process from traveling forward. In operation, a charge of air and fuel is fed into the tube through the valve, and the valve is then closed. Detonation of the fuel-air mixture is initiated by an igniter located in the tube, and the resulting detonation shock waves travel down the tube, raising both the temperature and the pressure of the products. The combustion products are expelled out of the open aft end, creating a pulse of forward thrust. When the shock waves have reflected within the tube to the appropriate conditions, a new charge is fed into the tube through the valve and the cycle repeats. It is generally desirable to generate pulses at a high frequency to produce smooth, nearly steady state propulsion.

The valve is provided at the forward end of the tube to prevent pressure waves from escaping out the front of the device and, more importantly, to prohibit the detonation flame front from traveling into the fuelair inlet system. The valve also must permit high inlet flows into the pulse detonation tube while maintaining a consistently good seal. The pulse detonation cycle requires that the valve operate at extremely high temperatures and pressures and must also operate at exceedingly high frequencies to produce smooth propulsion. These extreme conditions significantly reduce the high cycle fatigue (HCF) reliability of conventional valve systems, such as poppet or flapper-type valves.

Because of their oscillatory, "back-and-forth" nature, enabling such conventional valve systems to function reliably in a pulse detonation environment is a huge technical challenge, particularly given the inherent high inertia of these systems. One way to circumvent the HCF and inertia problems is to use a rotary valve instead of a poppet-type valve. Such valves typically employ a continuously rotating, ported plate. As the plate rotates, its ports periodically align either with a stationary plate with identical ports or with ports along the sides of the stationary pulse detonation chamber walls, thereby allowing intermittent flow into the pulse detonation chamber. Although a continuously rotating device will not encounter the same HCF reliability issues as an oscillating system, the currently available rotary valves could experience problems when used in the pulse detonation environment. For instance, the large pressures generated by the detonations can cause flexure of the rotating plate leading to binding of the plate and seal degradation. Also, maintaining a seal around the relatively large, flat surfaces of the rotating plate to isolate inlet flow and detonated products can be challenging. Another drawback of current rotary valves is that they often require the drive system for the rotating plate to be located in the primary gas path, resulting in flow reduction and performance losses.

Accordingly, it would be desirable to have a rotary valve for pulse detonation engines that overcomes the problems experienced by current rotary valves.

BRIEF SUMMARY OF THE INVENTION

The above-mentioned need is met by the present invention, which provides a rotary valve for pulse detonation engines that includes a rotor rotatively mounted in the forward end of the pulse detonation tube and a plurality of transfer plenums for receiving fuel and air arranged around the rotor and partially disposed over the forward end of the tube. The rotor has a plurality of internal flow passages formed therein which periodically align with a plurality of inlet ports formed near the forward end of the tube as the rotor rotates. Each one of the transfer plenums is aligned with a corresponding one of the inlet ports so that the flow passages will establish fluid communication between the tube and the transfer plenums when aligned with the inlet ports.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
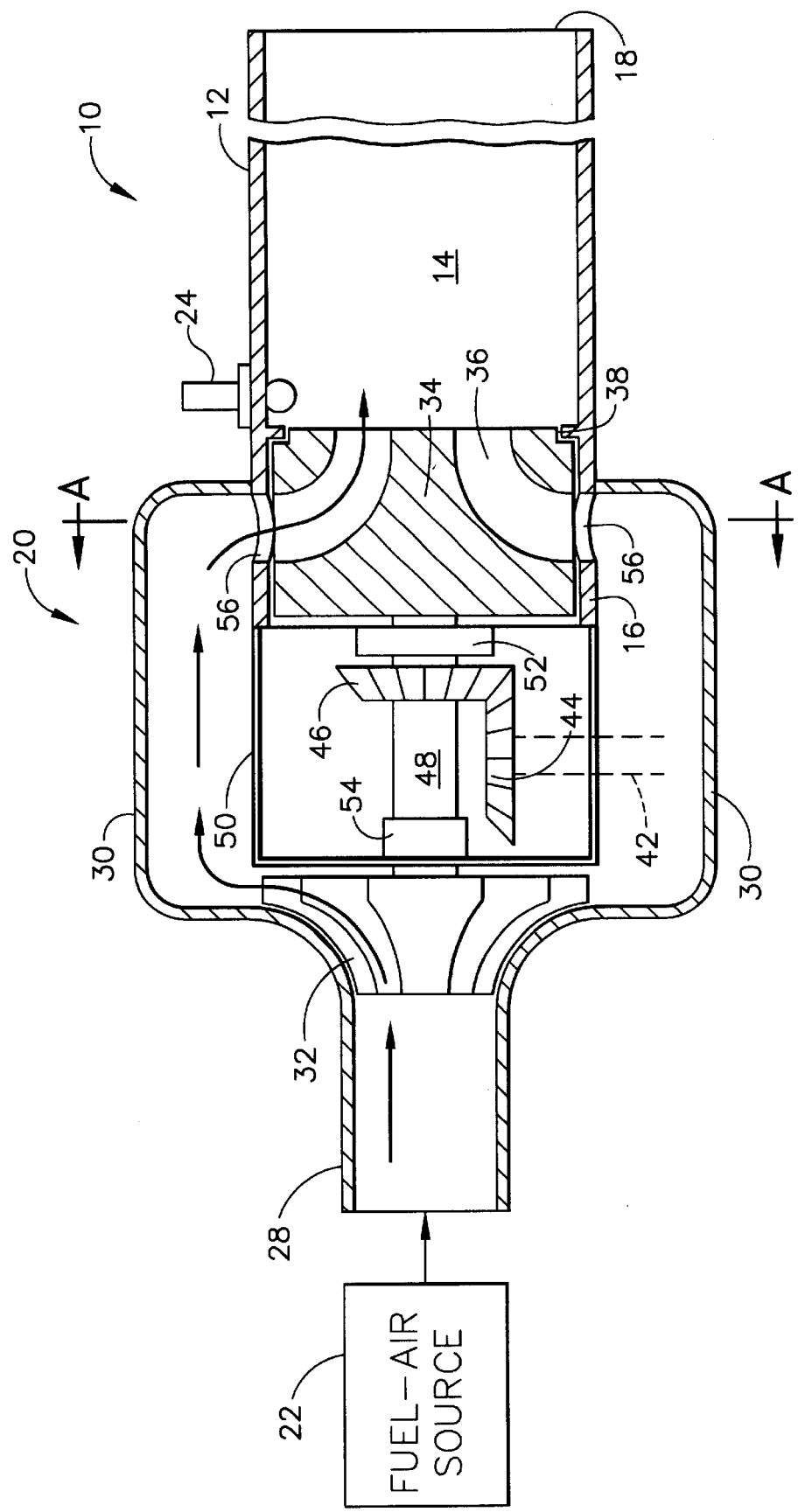
FIG. 1 is a sectional view of a pulse detonation engine having a first embodiment of a rotary valve.

Referring to the drawings wherein identical reference numerals denote the same elements throughout the various views, FIG. 1 shows a pulsed detonation engine 10 capable of generating forward thrust and useful in many propulsive applications such as a turbofan augmentor, a replacement for the high pressure turbomachinery of a conventional gas turbine engine, and a rocket engine. The pulse detonation engine 10 includes a tube 12 having a prescribed length and defining an internal combustion chamber 14. The tube 12 has a forward end 16 and an open aft end 18. A rotary valve 20 is mounted to the forward end 16 and operates to intermittently introduce a fuel-air mixture into the combustion chamber 14. To this end, the valve 20 is connected to a fuel-air source 22. The source 22 can be any means of providing a mixture of fuel and air, many of which are known in the combustion art. The open aft end 18 of the tube 12 provides an exhaust to the ambient.

An igniter 24 is provided in the tube 12 adjacent to the valve 20. The igniter 24 produces sufficient energy to detonate the fuel-air mixture in the combustion chamber 14. The region of the combustion chamber 14 in the immediate vicinity of the igniter 24 is referred to herein as the detonation zone. Detonation combustion depends on the pressure, temperature and equivalence ratio of the fuel-air mixture, as well as the amount of energy released to start ignition. By locating the igniter 24, and hence the detonation zone, closer to the forward end 16 than the aft end 18, a larger portion of the tube length is devoted to generating thrust. The overall length of the tube 12 will depend on the desired operating frequency of the pulse detonation engine 10.

Figure 2:
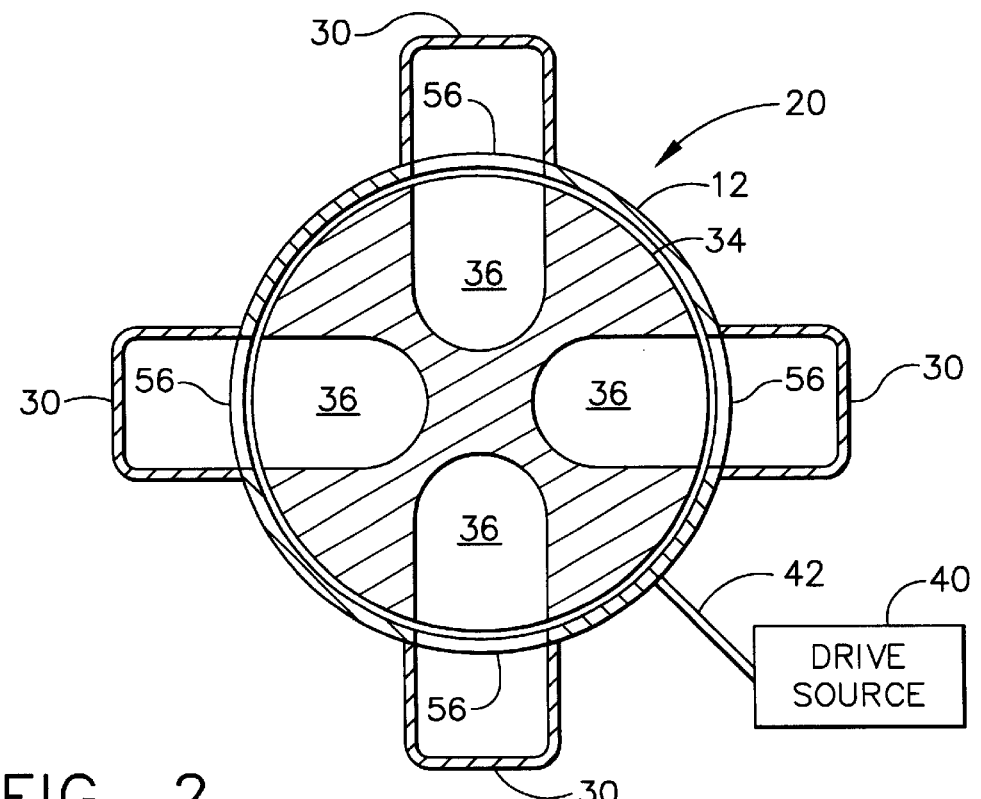
FIG. 2 is a cross-sectional view taken along line A—A of FIG. 1 with the rotary valve in an open position.
Figure 3:
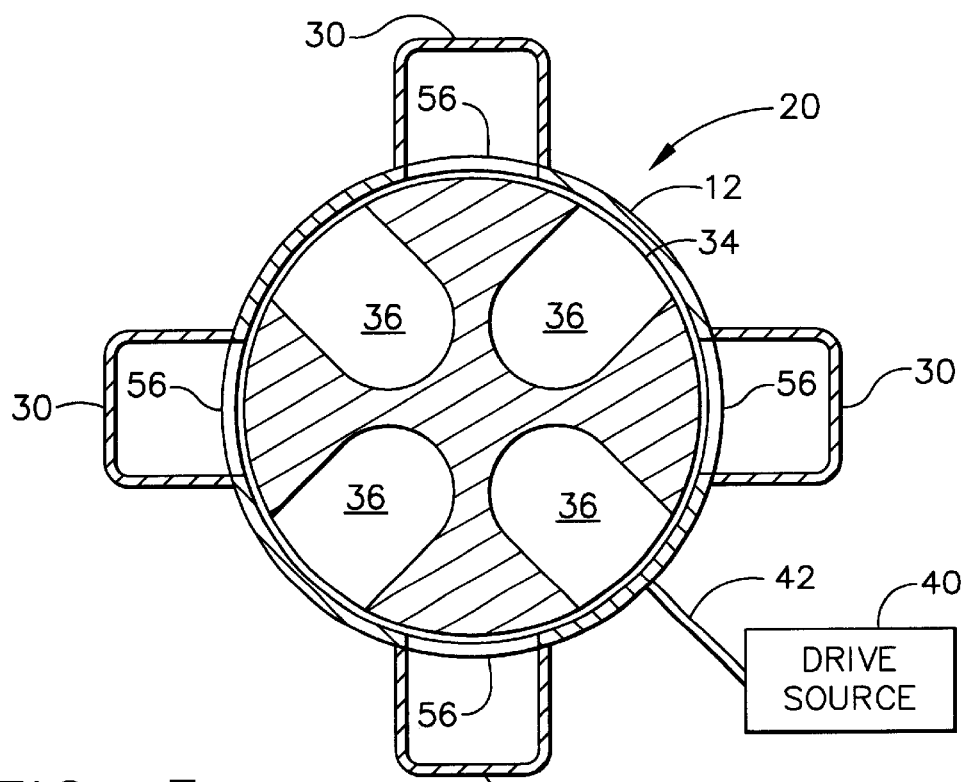
FIG. 3 is a cross-sectional view taken along line A—A of FIG. 1 with the rotary valve in a closed position.

Referring now to FIGS. 2 and 3 in addition to FIG. 1, the rotary valve 20 includes a fuel-air inlet 28 that is formed on the forward end thereof and is connected to the fuel-air source 22. Four axially extending transfer plenums 30 circumferentially arranged about the perimeter of the valve 20 and are partially disposed over the forward end 16 of the tube 12. The transfer plenums 30, which are preferably equally spaced about the circumference of the valve 20, are hollow passages through which the fuel-air mixture is directed. A centrifugal compressor 32 is rotatively mounted in the aft end of the fuel-air inlet 28. The compressor 32 pressurizes the incoming fuel-air mixture, and the pressurized fuel-air mixture is dispersed radially into the transfer plenums 30. Although the compressor 32 is shown in FIG. 1 to be a single-stage compressor, it should be noted that multi-stage compressors could alternatively be used.

A valve rotor 34 is rotatively mounted in the forward end 16 of the tube 12, flush with the forward edge thereof and surrounded by the transfer plenums 30. The rotor 34 is a cylindrical block having four internal flow passages 36 formed therein. To seal the valve 20 around the valve rotor 34, an annular ridge 38 is formed on the inner surface of the tube 12, spaced from the forward edge of the tube a distance equal to the axial length of the rotor 34. The seal ridge 38 overlaps the aft end of the rotor 34 to block the back flow of detonated gases from passing into the clearance between the rotor 34 and the tube 12. It should be noted that this is just one possible approach to sealing the valve; other sealing arrangements are also possible.

Both the compressor 32 and the rotor 34 are driven by a drive train comprising a external drive source 40 (such as a motor or the like), a drive shaft 42, first and second meshing bevel gears 44, 46 and an internal axle 48. The axle 48 is rotatively mounted in a cylindrical housing 50 by a thrust bearing 52 designed to absorb the axial force of the pulse detonation process and a radial support bearing 54. The housing 50 is disposed between the compressor 32 and the valve rotor 34, so that its aft end abuts the forward edge of the tube 12. The housing 50 has substantially the same diameter as the tube 12 and is surrounded by the transfer plenums 30. The axle 48 is disposed along the longitudinal axis of the housing 50, and thus along the longitudinal axis of the tube 12. A first end of the axle 48 extends axially beyond the forward end of the housing 50 to drivingly engage the compressor 32, and the second end of the axle 48 extends axially beyond the aft end of the housing 50 to drivingly engage the rotor 34. The drive shaft 42 is oriented perpendicularly to the axle 48 so as to extend radially between two adjacent transfer plenums 30 and into the housing 50. The first bevel gear 44 is fixedly mounted to the end of the drive shaft 42 inside the housing 50 and meshes with the second bevel gear 46, which is fixedly mounted on the axle 48. Thus, when the drive shaft 42 is rotated by the external drive source 40, the axle 48 rotates the compressor 32 and the rotor 34. The bevel gears 44, 46, axle 48 and bearings 52, 54 are all contained within the housing 50 and are thus not located in the inlet flow of fuel-air mixture from the source 22 to the combustion chamber 14. In addition, by extending between two adjacent transfer plenums, the drive shaft 42 is also not located in the fuel-air mixture inlet flow.

Four inlet ports 56 are formed in the wall of the tube 12. The ports 56 are located near the forward end of the tube 12 and are circumferentially spaced so that each port 56 is aligned with a corresponding one of the transfer plenums 30. The internal flow passages 36 are spaced about the rotor 34 so that when one of the passages 36 is aligned with one of the ports 56, each one of the other passages 36 is aligned with a corresponding one of the other ports 56. As the rotor 34 rotates, the flow passages 36 will periodically align with the ports 56. Whenever the flow passages 36 are aligned with the ports 56, as shown in FIG. 2, the transfer plenums 30 are in fluid communication with the combustion chamber 14 and the valve 20 is in an open position. Accordingly, fuel-air mixture in the transfer plenums 30 flows through the inlet ports 56 and the flow passages 36 and enters axially into the combustion chamber 14. The size of the flow passage openings relative to the size of the inlet ports 56 will affect how much fuel-air mixture will flow into the combustion chamber 14 each time the valve 20 opens. The inlet ports 56 can be circumferentially elongated with respect to the flow passage openings to increase the time the valve 20 is open for a given rotor speed.

When the passages 36 are not aligned with the inlet ports 56, as shown in FIG. 3, the valve 20 is in a closed position. When the valve 20 is closed, fuel-air mixture does not flow into the combustion chamber 14. More importantly, the detonation process is prevented from escaping out the front of the tube 12 and migrating into the transfer plenums 30, which contain fresh fuel-air mixture. As the rotor 34 rotates, the valve 20 opens and closes four times per revolution. Thus, the valve 20 is able to provide high frequency operation without the back-and-forth mechanical motion of non-rotary valves.

Operation of the pulse detonation engine 10 is initiated by activating the external drive source 40 to produce continuous rotation of the compressor 32 and the rotor 34 . The rotating compressor 32 will pressurize and further mix fuel-air mixture from the source 22 and discharge the pressurized mixture into the transfer plenums 30. Every time the valve 20 opens, a charge of the fuel-air mixture is introduced into the combustion chamber 14. The igniter 24 is periodically activated to detonate the fuel-air mixture in the combustion chamber 14. Upon detonation of the fuel-air mixture, detonation waves will propagate in both the forward and aft directions. The forward wave will be contained and reflected by the valve 20, which will have assumed its closed position as the rotor 34 rotates. The aft wave travels downstream from the detonation zone through the generally longer aft portion of the tube 12, consuming the fuel-air mixture along the way. As the aft pressure wave, which is a compression wave, accelerates through the combustion chamber 14, it raises both temperature and pressure. When the aft wave reaches the aft end 18 of the tube 12, the hot, high pressure combustion products are expelled out of the open aft end, creating a pulse of forward thrust. The aft pressure wave is then reflected at the aft end 18 as an expansion wave that propagates forward back through the tube 12. The expansion wave lowers pressure in the combustion chamber 14 and further evacuates the tube 12. At the point when the chamber pressure is at its lowest, the valve 20 re-opens and a fresh charge of pressurized fuel-air mixture from the transfer plenums 30 is then drawn into the combustion chamber 14, readying the pulse detonation engine 10 for the next cycle.

The rotational speed of the rotor 34, which determines the opening frequency of the valve 20, is selected so that the valve frequency matches the desired operating frequency of the pulse detonation engine 10. That is, the rotor speed is such that a fresh charge of the fuel-air mixture is introduced into the combustion chamber 14 with the same frequency that the igniter 24 is fired. The timing is such that the valve 20 re-opens just as the reflected expansion wave from the prior detonation cycle is reflected back to the valve face. Thus, the combustion chamber 14 will be evacuated and at relatively low pressure when the valve 20 opens. Because of the pressure difference between the pressurized fuel-air mixture in the transfer plenums 30 and the relatively low pressure of the combustion chamber 14, the fuel-air mixture is quickly drawn into the combustion chamber 14. This allows for faster refill time and high frequency operation. The combustion chamber fill time is also dependent on the length of the transfer plenums 30 and the circumferential elongation of the inlet ports relative to the flow passage openings. The length of the plenums 30 and the size of the ports 56 are thus selected to optimize fill time, depending on the operating frequency of the pulse detonation engine 10.

The rotary valve 20 has many advantages in addition to providing reliable, high frequency operation. For instance, the valve provides substantially axial injection of the fuel-air mixture into the combustion chamber 14. This ensures that a fresh mixture of unburned gas will be at the forward end of the tube 12 when detonation occurs and provides a distinct boundary layer between the burned gas and unburned mixture. From a mechanical standpoint, this design allows the drive shaft 42, gears 44, 46, axle 48 and bearings 52, 54 to be isolated from the compressor and pulse detonation tube gas paths, thereby avoiding a possible loss of cycle inlet performance. The entire system has a small frontal area and can be completely modular in assembly. Since the valve rotor 34 has a relatively large mass, it has the robustness to withstand the detonation forces.

Figure 4:
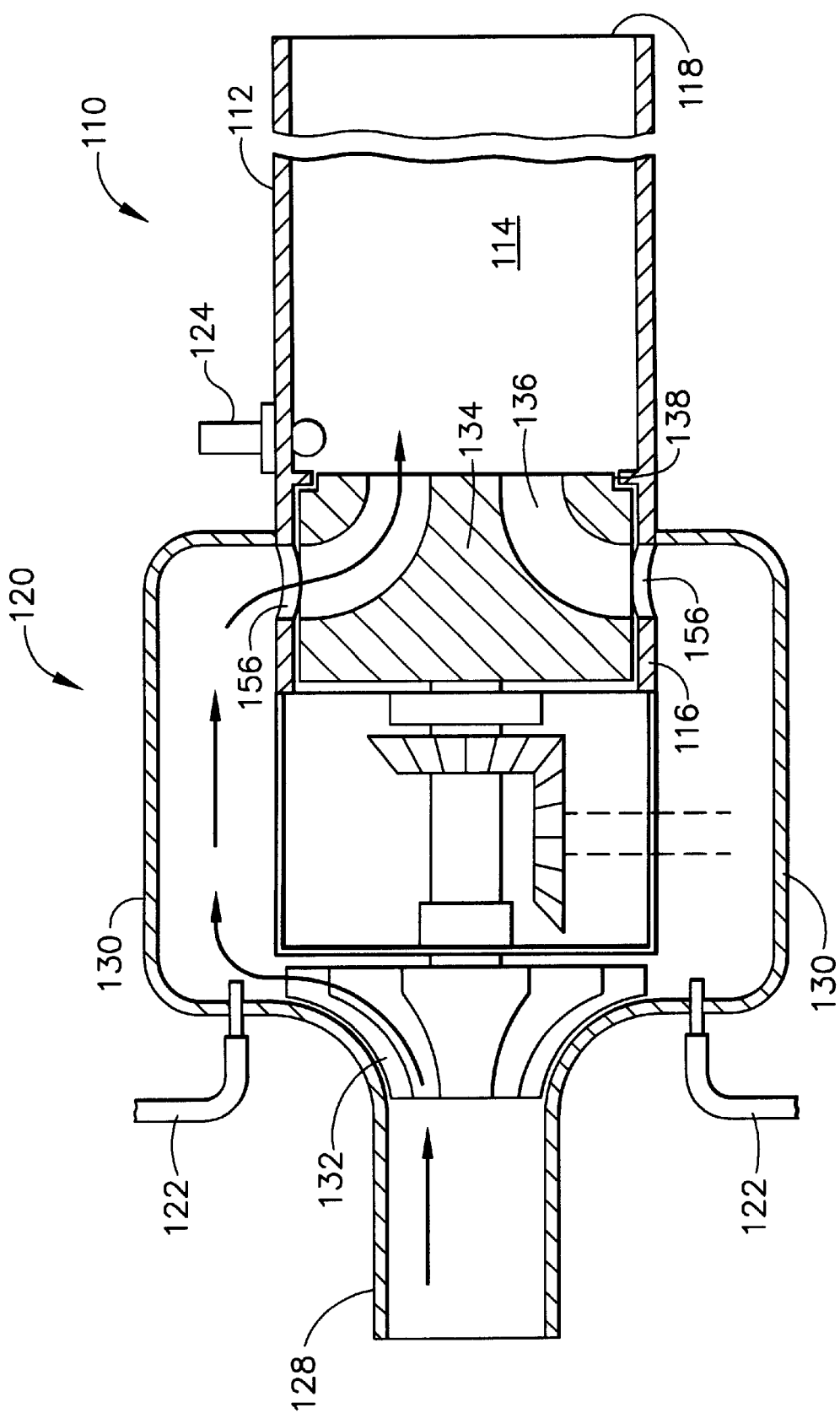
FIG. 4 is a sectional view of a pulse detonation engine having an alternative embodiment of a rotary valve.

FIG. 4 shows a pulsed detonation engine 110 of an alternative embodiment. The pulse detonation engine 110 includes a tube 112 having a prescribed length and defining an internal combustion chamber 114. The tube 112 has a forward end 116 and an open aft end 118. A rotary valve 120 is mounted to the forward end 116 and operates to intermittently introduce a fuel-air mixture into the combustion chamber 114. An igniter 124 is provided in the tube 112 adjacent to the valve 120 for initiating detonation of the fuelair mixture in the combustion chamber 114.

As in the first described embodiment, the rotary valve 120 includes an inlet 128 formed on the forward end thereof and four axially extending transfer plenums 130 circumferentially arranged about the perimeter thereof and partially disposed over the forward end 16 of the tube 12. A centrifugal compressor 132 is rotatively mounted in the aft end of the inlet 128. A valve rotor 134 is rotatively mounted in the forward end 116 of the tube 112, flush with the forward edge thereof and surrounded by the transfer plenums 130. The rotor 134 is a cylindrical block having four internal flow passages 136 formed therein and is sealed by an annular ridge 138 formed on the inner surface of the tube 112. The compressor 132 and the rotor 134 are driven by a drive train in the same manner as that described above in connection with the first embodiment.

Four inlet ports 156 are formed in the wall of the tube 112. The ports 156 are located near the forward end of the tube 112 and are circumferentially spaced so that each port 156 is aligned with a corresponding one of the transfer plenums 130. The internal flow passages 136 are spaced about the rotor 134 so that when one of the passages 136 is aligned with one of the ports 156, each one of the other passages 136 is aligned with a corresponding one of the other ports 156. Thus, the valve 120 repeatedly opens and closes as the rotor 134 rotates.

To the extent described thus far, the pulse detonation engine 110 is essentially the same as the pulse detonation engine 10 of the first embodiment. The alternative embodiment differs in that the inlet 128 is not connected to a fuel-air source. Instead, the inlet 128 draws in only air from the surrounding environment. The rotating compressor 132 pressurizes the incoming air, and the pressurized air is dispersed radially into the transfer plenums 130. A fuel injector 122 is provided for each transfer plenum 130 for injecting fuel directly into the transfer plenums 130 where it mixes with the pressurized air.

Operation of the pulse detonation engine 110 is very similar to the operation of the first embodiment. The rotating compressor 132 pressurizes incoming air and discharges the pressurized air into the transfer plenums 130. The pressurized air mixes with fuel injected into the transfer plenums 130 from the fuel injectors 122. Every time the valve 120 opens, a charge of the fuel-air mixture is introduced into the combustion chamber 114. The igniter 124 is periodically activated to detonate the fuel-air mixture in the combustion chamber 114. Upon detonation, the valve 120 will be closed so as to contain the forward detonation wave. The aft detonation wave will propagate downstream from the detonation zone, consuming the fuel-air mixture along the way. When the aft wave reaches the aft end 18 of the tube 12, the hot, high pressure combustion products are expelled out of the open aft end, creating a pulse of forward thrust. As the aft pressure wave is reflected back to the forward end of the tube 112 as an expansion wave, the valve 120 re-opens and a fresh charge of fuel-air mixture from the transfer plenums 130 is then drawn into the combustion chamber 114, thereby readying the pulse detonation engine 110 for the next cycle.

While two embodiments have been described above, the present invention can include other alternatives. For instance, while the Figures show four transfer plenums, four flow passages and four inlet ports, the present invention is not limited to this number of these elements. The rotary valve of the present invention could have as many transfer plenums, flow passages and inlet ports as is physically possible for the rotor size. The optimal number of flow paths would be determined based on the pulse detonation operating frequency and the flow requirements. Furthermore, the present invention is not necessarily limited to equal numbers of the transfer plenums, flow passages and inlet ports. For example, a valve could be constructed with eight plenums and inlet ports and four flow passages. In this case, the valve would open and close eight times per rotor revolution. Another alternative would be to omit the centrifugal compressor, which is not directly involved in the valve function. Eliminating the compressor would reduce the power required to drive the valve, but the benefit to the pulse detonation cycle performance gained by the increased fuel-air inlet pressure would be lost. Other possible alternatives include having the rotor rotate in a stepped fashion instead of continuous rotation and replacing the geared drive train with an air turbine system or an equivalent.

The foregoing has described rotary valve for pulse detonation engines that includes a radial-inlet, axial-injection ported rotor assembly. While specific embodiments of the present invention have been described, it will be apparent to those skilled in the art that various modifications thereto can be made without departing from the spirit and scope of the invention as defined in the appended claims.

What is claimed is:

1. In a pulse detonation engine including a tube having a forward end and an aft end, a rotary valve comprising:

a rotor rotatively mounted in said forward end of said tube, said rotor having a plurality of internal flow passages formed therein; and a plurality of transfer plenums for receiving fuel and air arranged around said rotor, wherein said flow passages will periodically establish fluid communication between said tube and said transfer plenums as said rotor rotates.

2. The rotary valve of claim 1 wherein there are equal numbers of said internal flow passages and said transfer plenums.

3. The rotary valve of claim 1 further comprising an inlet for introducing a fluid to said transfer plenums.

4. The rotary valve of claim 3 further comprising a compressor rotatively mounted in said inlet for pressurizing said fluid.

5. The rotary valve of claim 4 further comprising an axle that drivingly engages said rotor and said compressor.

6. The rotary valve of claim 5 further comprising means for rotating said axle.

7. The rotary valve of claim 6 wherein said means for rotating said axle comprise a drive shaft, a first gear fixedly mounted to said drive shaft, and a second gear fixedly mounted to said axle and meshing with said first gear.

8. The rotary valve of claim 7 further comprising a housing containing said axle and said first and second gears.

9. The rotary valve of claim 3 wherein said fluid introduced to said transfer plenums via said inlet is a fuel-air mixture.

10. The rotary valve of claim 3 wherein said fluid introduced to said transfer plenums via said inlet is air.

11. The rotary valve of claim 10 further comprising a plurality of fuel injectors for directly injecting fuel directly into said transfer plenums.

12. A pulse detonation engine comprising:

a tube having a forward end and an open aft end, and a plurality of inlet ports formed therein near said forward end;

a rotor rotatively mounted in said forward end of said tube, said rotor having a plurality of internal flow passages formed therein; and a plurality of transfer plenums for receiving fuel and air arranged around said rotor and partially disposed over said forward end of said tube, each one of said transfer plenums being aligned with a corresponding one of said inlet ports, wherein said flow passages will periodically align with said inlet ports and establish fluid communication between said tube and said transfer plenums as said rotor rotates.

13. The pulse detonation engine of claim 12 further comprising an igniter disposed in said tube adjacent to said rotor.

14. The pulse detonation engine of claim 12 further comprising an annular ridge formed on an inner surface of said tube and overlapping said rotor so as to provide a seal between said rotor and said tube.

15. The pulse detonation engine valve of claim 12 wherein there are equal numbers of said internal flow passages and said transfer plenums.

16. The pulse detonation engine of claim 12 further comprising an inlet for introducing a fluid to said transfer plenums.

17. The pulse detonation engine of claim 16 further comprising a compressor rotatively mounted in said inlet for pressurizing said fluid.

18. The pulse detonation engine of claim 17 further comprising an axle that drivingly engages said rotor and said compressor.

19. The pulse detonation engine of claim 18 further comprising means for rotating said axle.

20. The pulse detonation engine of claim 19 wherein said means for rotating said axle comprise a drive shaft, a first gear fixedly mounted to said drive shaft, and a second gear fixedly mounted to said axle and meshing with said first gear.

21. The pulse detonation engine of claim 20 further comprising a housing containing said axle and said first and second gears.

22. The pulse detonation engine of claim 16 wherein said fluid introduced to said transfer plenums via said inlet is a fuel-air mixture.

23. The pulse detonation engine of claim 16 wherein said fluid introduced to said transfer plenums via said inlet is air.

24. The pulse detonation engine of claim 23 further comprising a plurality of fuel injectors for directly injecting fuel directly into said transfer plenums.

* * * * *